(12) United States Patent
Bataller

(10) Patent No.: US 10,444,790 B1
(45) Date of Patent: Oct. 15, 2019

(54) ELECTRONIC DEVICE CARRYING CASE AND DISPLAY STAND

(71) Applicant: Andrew Padua Bataller, Chula Vista, CA (US)

(72) Inventor: Andrew Padua Bataller, Chula Vista, CA (US)

( * ) Notice: Subject to any disclaimer, the term of this patent is extended or adjusted under 35 U.S.C. 154(b) by 0 days.

(21) Appl. No.: 16/258,551

(22) Filed: Jan. 26, 2019

(51) Int. Cl.
| G06F 1/16 | (2006.01) |
| A45C 11/00 | (2006.01) |
| H04B 1/3888 | (2015.01) |

(52) U.S. Cl.
CPC ............ *G06F 1/1628* (2013.01); *A45C 11/00* (2013.01); *H04B 1/3888* (2013.01); *A45C 2011/002* (2013.01); *A45C 2200/15* (2013.01); *G06F 2200/1633* (2013.01)

(58) Field of Classification Search
CPC .......... G06F 1/20; G06F 1/203; H04W 24/04; H04W 88/08; H04W 16/18
See application file for complete search history.

(56) References Cited

U.S. PATENT DOCUMENTS

| 10,185,358 B1 | 1/2019 | Bataller | |
| 2010/0105220 A1* | 4/2010 | Di Stefano | H01R 4/027 439/66 |
| 2014/0163664 A1* | 6/2014 | Goldsmith | A61B 17/00491 623/1.11 |

\* cited by examiner

*Primary Examiner* — Diane D Mizrahi
(74) *Attorney, Agent, or Firm* — Kenneth W. Float

(57) ABSTRACT

Disclosed is apparatus for carrying, protecting, and displaying an electronic device, such as a smartphone. The apparatus comprises a housing having exterior walls defining a cavity configured to slidably receive an electronic device. Vertical and angled slots are formed by removed portions of front and adjacent side walls of the housing, and the slots are sized to receive the electronic device and support the electronic device for display to a user. A rectangular groove is formed in a back wall of the housing facing the cavity that is substantially vertically aligned with the removed portions of the front and adjacent side walls of the housing defining the vertical slot.

10 Claims, 6 Drawing Sheets

US 10,444,790 B1

ELECTRONIC DEVICE CARRYING CASE AND DISPLAY STAND

BACKGROUND

The present invention relates generally to electronic device carrying cases and stands for use therewith, and more particularly, to a protective carrying case and display stand for protecting, carrying, and displaying an electronic device such as a smartphone.

Numerous carrying cases, and with and without stands, have heretofore been designed for carrying and protecting different types of electronic devices, such as smartphones, and the like. Commonly, device stands have been integrated into the cases and fold or rotate into place to support the device. Also, stand-alone device stands have been used to support such devices. However, no known carrying case has a structure into which the electronic device is inserted to protect the device while it is carried and also includes structures that are used to display the device to a user in vertical and angled orientations.

Exemplary smartphone carrying cases are sold on eBay.com and Amazon.com, for example, and include cases that have stands that rotate or fold into place to support the device along with slip cases that protect the device. Again, however, no known carrying case has included a stand into which the device is inserted that protects the device while it is carried and also includes structures for displaying the device to a user.

The present inventor has heretofore developed a protective case and stand well-suited for use with larger tablet electronic devices, and the like, although this product may be adapted for use with smaller electronic devices, such as smartphones. This product is disclosed in U.S. Pat. No. 10,185,358, having an issue date of Jan. 22, 2019. Thus product includes a housing that encloses the electronic device and a separate stand that is used to hold the housing and electronic device when it is carried. The stand has angled and orthogonal slots formed on an outer surface that support the housing for display.

It would be desirable to have electronic device carrying and display apparatus, that is particularly well-suited for use with a smartphone device, that is used to carry, protect, and display the electronic device in multiple orientations and viewing angles. It would be desirable to have electronic device carrying apparatus that provides a protective cover for the electronic device while it is carried, and that can support the device vertically or at a predetermined viewing angle.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
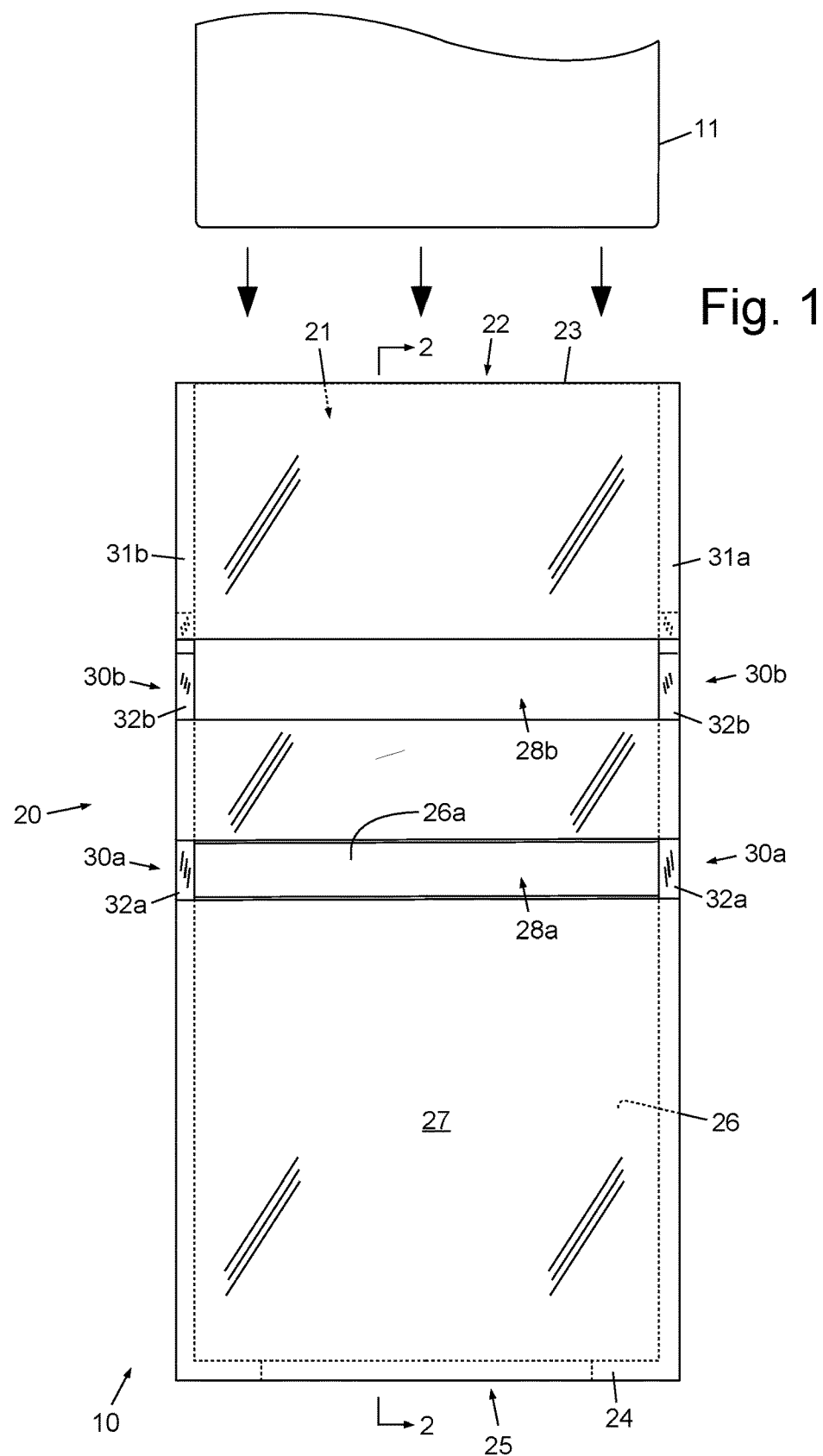
FIG. 1 shows a front view of exemplary electronic device carrying and display apparatus with a smartphone electronic device partially inserted therein.

Referring to the drawing figures, disclosed is exemplary apparatus 10 for carrying, protecting, and displaying an electronic device 11, such as a smartphone, for example. The exemplary apparatus 10 is particularly well-suited for use with an electronic device 11 such as an IPHONE X MAX® smartphone manufactured by Apple, Inc., or a GALAXY NOTE 9® smartphone manufactured by Samsung Electronics Co., Ltd., for example. FIG. 1 shows a front view of a molded plastic embodiment of the apparatus 10. However, it is to be understood that the housing 20 may be fabricated using any suitable material. The exemplary apparatus 10 comprises a housing 20 that is used to protect the device 11 while it is carried, a vertical slot 30a (i.e., substantially orthogonal or perpendicular to a front surface of the housing 20), and an angled slot 30b (i.e., angled with respect to the front surface of the housing 20) that are respectively used to support the electronic device 11 in vertical and angled positions for viewing.

As is shown in FIG. 1, the housing 20 has a generally rectangular elongated box-like shape with outer walls comprising a bottom wall 24, a lower or back wall 26, an upper or front wall 27, side walls 31a, 31b, and a central elongated cavity 21 for holding the electronic device 11 when it is inserted into the cavity 21. A top opening 22 is disposed at a top end 23 of the housing 20 that allows the electronic device 11 (partially shown) that may be inserted into the cavity 21, as is shown by the arrows between the device 11 and the housing 20. The housing 20 has a generally U-shaped bottom end 24 or wall 24 that has a bottom opening 25 therein. However, the bottom end 24 or wall 24 may have any configuration that prevents the electronic device 11 from sliding out of the bottom end 24 of the housing 20. For example, projections, tabs, or a lip extending inwardly from edges of the cavity 21 in the plane of the bottom wall 24 toward a longitudinal axis of the housing 20 may be used to prevent the electronic device from sliding out of the bottom end 24 of the housing 20. The bottom opening 25 exposes one or more speakers and a connector port located at a bottom end of the electronic device 11 to permit sound to be heard and charging of the device 11 or connection of the device 11 to external devices when the device 11 is inserted into the cavity 21.

The housing 20 has a flat lower or back wall 26 with a groove 26a or ditch 26a formed in its inner surface facing the cavity 21. The housing 20 has a flat upper or front wall 27 with first and second openings 28a, 28b formed across the width of the upper or front wall 27 that are offset from each other. Opposite side walls 31a, 31b have first and second sidewall slots 32a, 32b formed therein that are adjacent to the first and second openings 28a, 28b of the front wall 27.

The first sidewall openings 32a are substantially orthogonal to, i.e., at substantially 90 degrees with respect to, the upper or front wall 27 and extend about half the width of the respective sidewalls 31a, 31b. Bottom edges of the first sidewall slots 32b are substantially parallel to the upper or front wall 27. The groove 26a or ditch 26a is substantially vertically aligned with the first slot 28a in the upper or front wall 27 and the first sidewall slots 32b in the side walls 31a, 31b. For clarity, lateral edges of the groove 26a or ditch 26a are shown slightly offset from the edges of the first slot 28a and the first sidewall slots 32b. The groove 26a or ditch 26a is squared-off at its edges (i.e., the edges are at 90 degrees to each other) in order to keep the device 11 (phone) from slipping or rotating when the phone is displayed in portrait orientation.

The second sidewall slots 32b are disposed at about 45 degrees with respect to the upper or front wall 27 and extend about two-thirds to three-fourths of the width of the respective sidewalls 31a, 31b. This is shown clearly in FIG. 2. Bottom edges of the second sidewall slots 32b are orthogonal to, i.e., at substantially 90 degrees with respect to, the angled direction of the second sidewall slots 32b.

The housing 20 is preferably made of molded plastic, which is a cost-effective way to fabricate it. However, it is to be understood that the housing 20 may be fabricated using any suitable material. The outer walls 24, 26, 27, 31a, 31b of the housing 20 may be molded as a unitary structure using acrylonitrile butadiene styrene) ABS), polypropylene, or polycarbonate, for example. The thickness of the outer walls 24, 26, 27, 31a, 31b is on the order of 0.125 inches, which prevents the plastic from flexing during use.

FIG. 1 illustrates that the exemplary apparatus 10 is designed to have a smartphone electronic device 11 inserted therein. This condition or state is achieved by sliding the device 11 into the cavity 21 through the top opening 22 until it contacts an inner surface of the bottom end 24 or wall 24 of the housing 20. The cavity 21 is sized to secure the device 11 therein with a relatively tight slip fit so it does not easily fall or slide out of the housing 20.

The cavity 21 is thus configured to prevent the device 11 from losing contact with and sliding out of the housing 20 when carried, and protect the housing 20 when it is carried. The vertical and angled slots 30a, 30b formed in the housing 20 are configured to receive a selected edge of the device 11 to support it vertically and at about 45 degrees for display to a user.

FIG. 1 shows preferred locations of the vertical and angled slots 30a, 30b. The angled slot 30b is preferably offset toward one end of the housing 20 so that the weight of the electronic device 11 does not lift the proximal end of the housing 20 off of its resting place when the electronic device 11 is inserted into the angled slot 30b.

Figure 2:
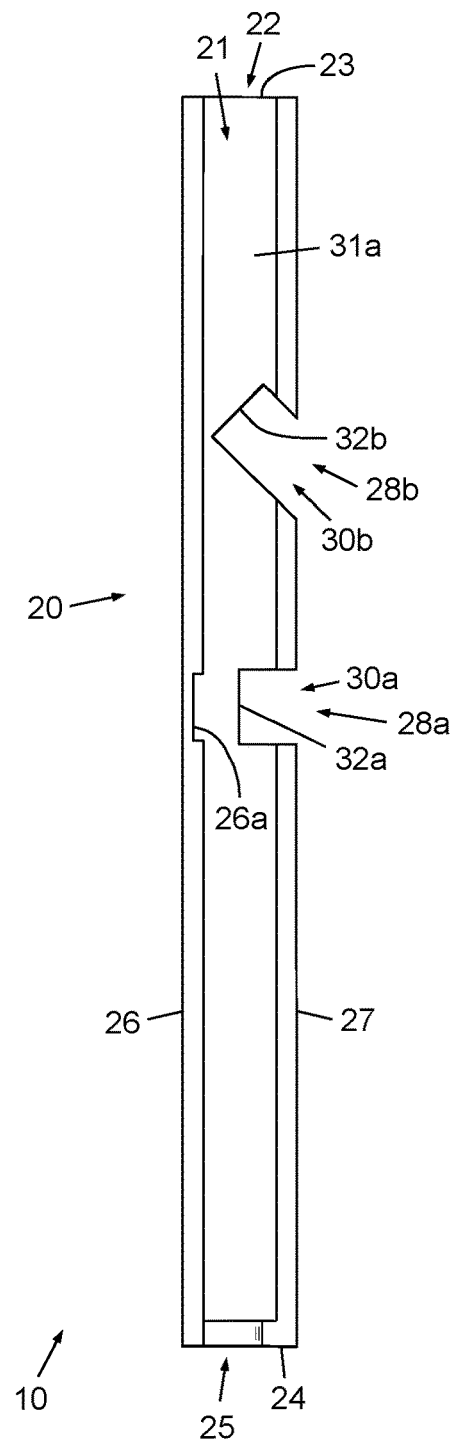
FIG. 2 is a cross-sectional side view of the exemplary electronic device carrying and display apparatus taken along the lines 2-2 in FIG. 1.

FIG. 2 is a cross-sectional side view of the exemplary device carrying and display apparatus taken along the lines 2-2 in FIG. 1. FIG. 2 more clearly shows possible locations of the vertical and angled slots 30a, 30b and the groove 26a or ditch 26a formed in the lower or back wall 26 of the housing 20.

Figure 3:
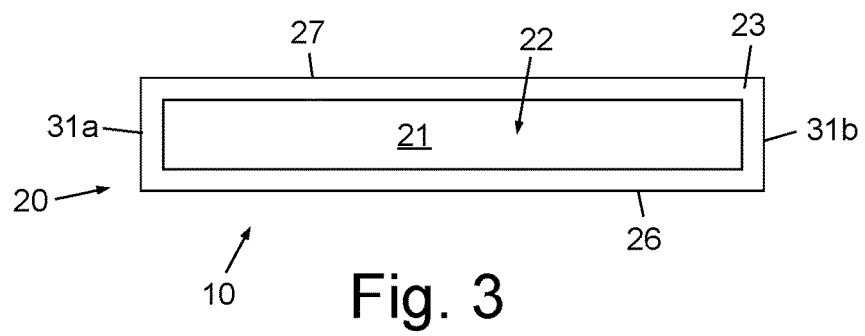
FIG. 3 is a top end view of the exemplary electronic device carrying and display apparatus.

FIG. 3 is a top end view of the exemplary device carrying and display apparatus 10. FIG. 3 illustrates that the top end 23 of the housing 20 is open to allow the electronic device 11 to slide into the cavity 21 until it reaches the U-shaped bottom end 24 of the housing 20.

Figure 4:
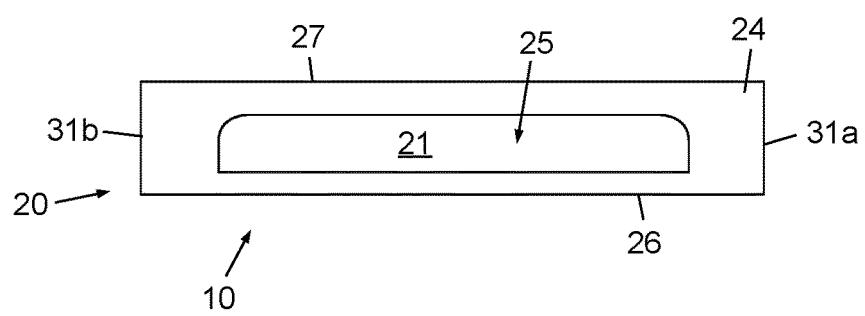
FIG. 4 is a bottom end view of the exemplary electronic device carrying and display apparatus.

FIG. 4 is a bottom end view of the exemplary device carrying and display apparatus 10. FIG. 4 shows the U-shaped bottom end 24 of the housing 20 and its bottom opening 25.

The housing 20 provides a means for holding the electronic device 11 to display it to the user. Vertical and fixed angled (45 degrees, for example) display orientations are provided using the vertical and angled slots 30a, 30b of the housing 20. Other angles may readily be selected.

Figure 5:
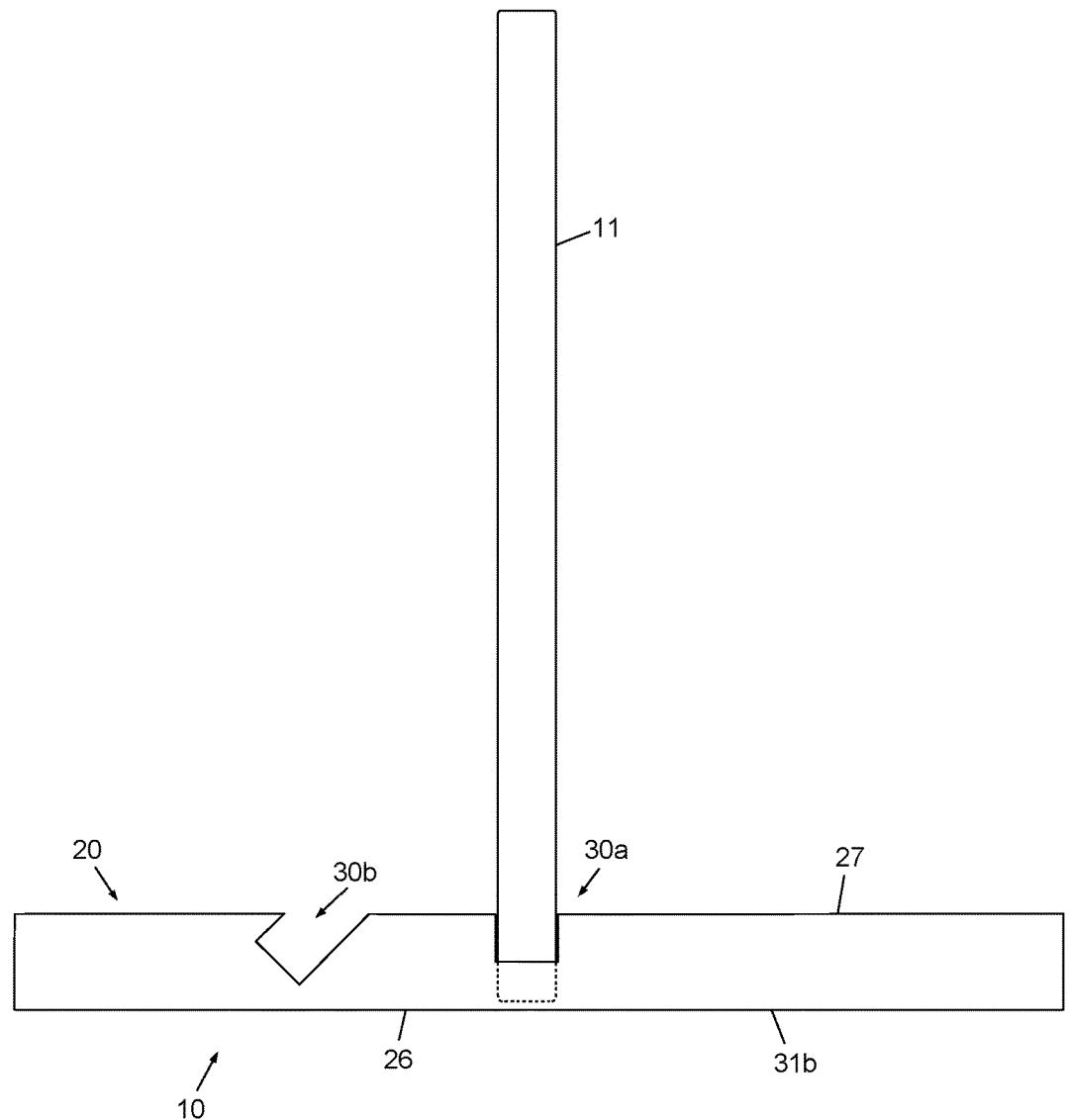
FIG. 5 shows an exemplary smartphone electronic device inserted into a vertical slot of the exemplary electronic device carrying and display apparatus in portrait mode.

FIG. 5 is a side view of the apparatus 10 and shows an exemplary smartphone electronic device 11 inserted into the vertical slot 30a of the exemplary housing 20 in portrait mode. This provides for vertical display of the device 11. The bottom hidden portion of the electronic device 11 sits in the groove 26a or ditch 26a inside the side walls 31a, 31b and is shown using dashed lines.

Figure 6:
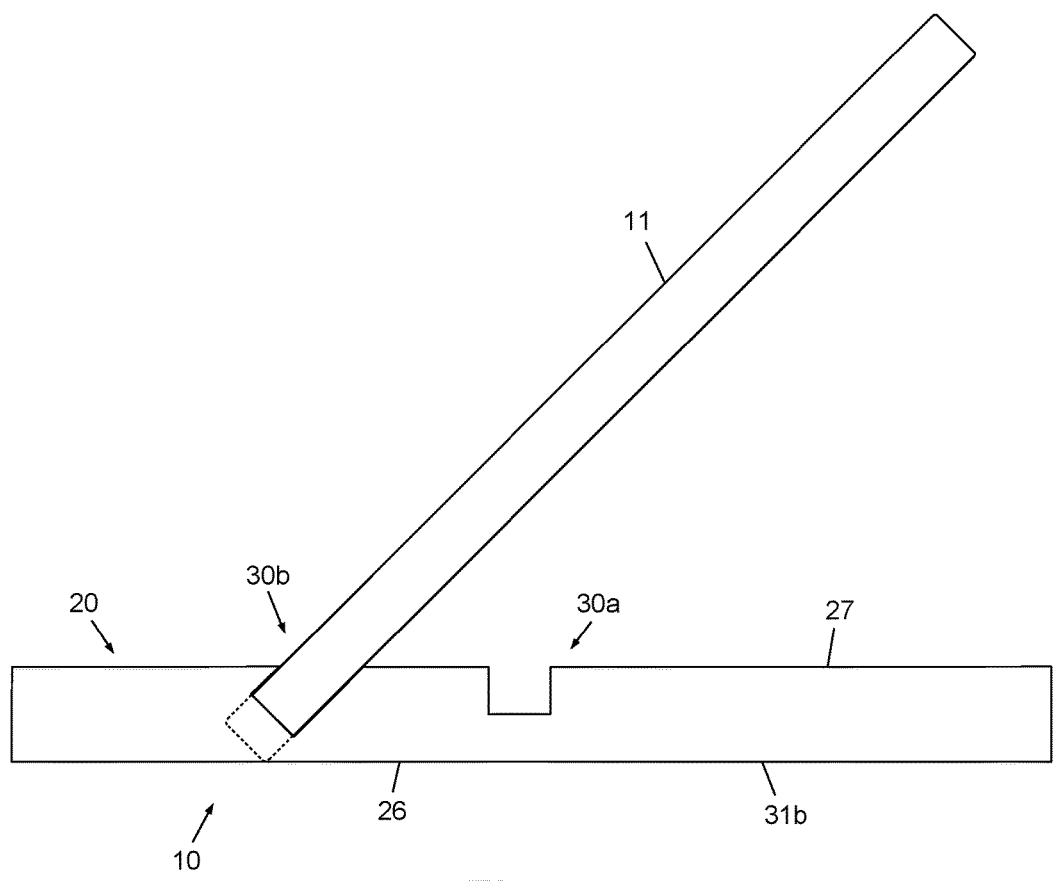
FIG. 6 shows an exemplary smartphone electronic device inserted into an angled slot of the exemplary electronic device carrying and display apparatus in portrait mode.

FIG. 6 is a side view of the apparatus 10 and shows an exemplary smartphone electronic device 11 inserted into the angled slot 30b of the exemplary housing 20 in portrait mode. This provides for vertical display of the device 11 if the housing 20 is placed on a surface that is substantially lower than the eyes of the user or viewer. The bottom hidden portion of the electronic device 11 contacts the lower or back wall 26 inside the sidewalls 31a, 31b and is shown using dashed lines.

Figure 7:
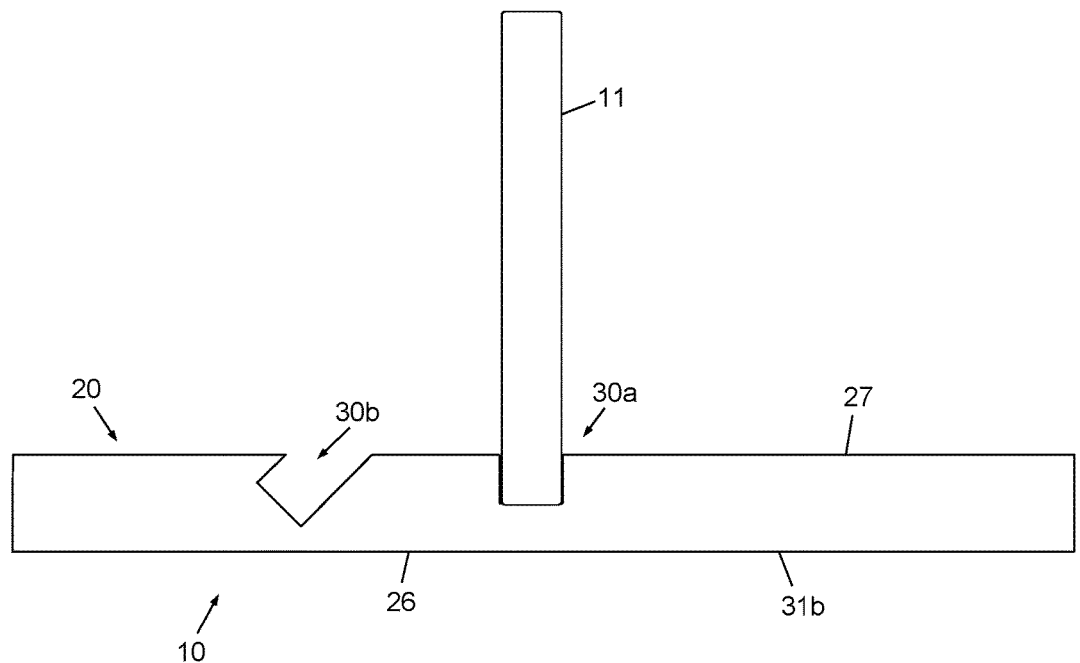
FIG. 7 shows an exemplary smartphone electronic device inserted into a vertical slot of the exemplary electronic device carrying and display apparatus in landscape mode.

FIG. 7 is a side view of the apparatus 10 and shows an exemplary smartphone electronic device 11 inserted into the vertical slot 30a of the exemplary housing 20 in landscape mode. This provides for horizontal display of the device 11.

Figure 8:
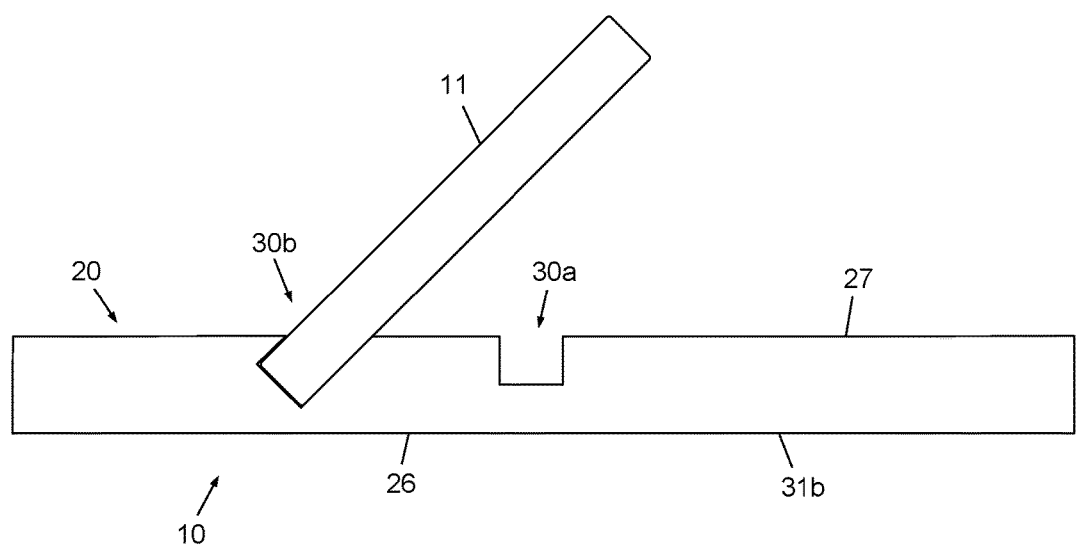
FIG. 8 shows an exemplary smartphone electronic device inserted into an angled slot of the exemplary electronic device carrying and display apparatus in landscape mode.

FIG. 8 is a side view of the apparatus 10 and shows an exemplary smartphone electronic device 11 inserted into the angled slot 30b of the exemplary housing 20 in landscape mode. This provides for horizontal display of the device 11 if the housing 20 is placed on a surface that is substantially lower than the eyes of the user or viewer.

In summary, the apparatus 10 comprises a protective housing 20 with an open-ended cavity 21 that is configured to slidably receive an electronic device 11, prevent the device 11 from losing contact with and sliding out of the housing 20 when carried, and cover and protect the device 11 when carried. A partially open end of the housing 20 is configured to allow access to a connection port and speakers of the electronic device 11. The apparatus 10 has vertical and angled slots 30a, 30b formed therein that are sized to receive a selected edge of the device 11 to support it in portrait and landscape orientations for display to a user or viewer. A groove 26a or ditch 26a formed in a lower or back wall 26 of the housing 20 prevents an electronic device 11 in portrait orientation disposed in the vertical slot 30a from rotating.

In operation, the the electronic device 11 is slid into the cavity 21 bottom first to for protection while it is carried. The device 11 is inserted into the top opening 22 of the housing 20 and slid until it contacts the bottom end 24 of the housing 20. The outer walls of the housing 20 cover and protect the device 11 and its display screen, buttons, and other operative components when carried. To view the device 11 using the housing 20 as a stand, the device 11 is removed from the cavity 21 and inserted into a either of the vertical and angled slots 30a, 30b.

It is to be understood that the above-described embodiment is merely illustrative of some of the many specific embodiments that represent applications of the principles of the present invention. Clearly, numerous and other arrangements can be readily devised by those skilled in the art without departing from the scope of the invention.

The invention claimed is:

1. Apparatus comprising:
   a housing having exterior walls defining a cavity configured to slidably receive an electronic device, vertical and angled slots formed by removed portions of front and adjacent side walls of the housing, which slots are sized to receive the electronic device for display to a user, and a rectangular groove formed in a back wall of the housing facing the cavity that is substantially vertically aligned with the removed portions of the front and adjacent side walls of the housing defining the vertical slot.

2. The apparatus recited in claim 1 wherein the removed portions of the side walls prevent the electronic device from rotating when the electronic device is disposed in either of the vertical or angled slots in landscape orientation.

3. The apparatus recited in claim 1 wherein the rectangular groove is configured to prevent the electronic device from rotating when the electronic device is disposed in the vertical slot in portrait orientation.

4. Apparatus comprising:
a housing having exterior walls and an open end defining a cavity sized to slidably receive and substantially surround an electronic device, vertical and angled slots formed by removed portions of front and adjacent side walls of the housing, which slots are sized to receive the electronic device and support the electronic device for display to a user, and a rectangular groove formed in a back wall of the housing facing the cavity that is substantially vertically aligned with the removed portions of the front and adjacent side walls of the housing defining the vertical slot.

5. The apparatus recited in claim 4 wherein the removed portions of the side walls prevent the electronic device from rotating when the electronic device is disposed in either of the vertical or angled slots in landscape orientation.

6. The apparatus recited in claim 4 wherein the rectangular groove is configured to prevent the electronic device from rotating when the electronic device is disposed in the vertical slot in portrait orientation.

7. Apparatus comprising:
a housing having exterior walls defining a cavity configured to slidably receive and substantially surround an electronic device, which cavity is configured to expose operative components of a bottom end of the electronic device when the electronic device is disposed in the housing, vertical and angled slots formed by removed portions of front and adjacent side walls of the housing, which slots are sized to receive the electronic device to support the electronic device for display to a user, and a rectangular groove formed in a back wall of the housing facing the cavity that is substantially vertically aligned with the removed portions of the front and adjacent side walls of the housing defining the vertical slot and that is sized to receive the electronic device when portrait orientation.

8. The apparatus recited in claim 7 wherein the removed portions of the side walls prevent the electronic device from rotating when the electronic device is disposed in either of the vertical or angled slots in landscape orientation.

9. The apparatus recited in claim 7 wherein the rectangular groove is configured to prevent the electronic device from rotating when the electronic device is disposed in the vertical slot in portrait orientation.

10. The apparatus recited in claim 7 wherein the rectangular groove is configured to prevent the electronic device from rotating when the electronic device is disposed in the vertical slot in portrait orientation.

\* \* \* \* \*